United States Patent
Dhakate et al.

(10) Patent No.: US 10,357,939 B2
(45) Date of Patent: Jul. 23, 2019

(54) HIGH PERFORMANCE LIGHT WEIGHT CARBON FIBER FABRIC-ELECTROSPUN CARBON NANOFIBERS HYBRID POLYMER COMPOSITES

(71) Applicant: Council of Scientific and Industrial Research, New Delhi (IN)

(72) Inventors: Sanjay Ragnath Dhakate, New Delhi (IN); Anisha Chaudhary, New Delhi (IN); Ashish Gupta, New Delhi (IN); Rakesh Behari Mathur, New Delhi (IN)

(73) Assignee: Council of Scientific and Industrial Research, New Delhi (IN)

( * ) Notice: Subject to any disclaimer, the term of this patent is extended or adjusted under 35 U.S.C. 154(b) by 318 days.

(21) Appl. No.: 14/805,306

(22) Filed: Jul. 21, 2015

(65) Prior Publication Data

US 2016/0059517 A1 Mar. 3, 2016

(30) Foreign Application Priority Data

Aug. 26, 2014 (IN) .......................... 2417/DEL/2014

(51) Int. Cl.
| | |
|---|---|
| *B32B 5/26* | (2006.01) |
| *D01D 5/00* | (2006.01) |
| *D01F 9/10* | (2006.01) |
| *B32B 27/12* | (2006.01) |
| *B32B 27/38* | (2006.01) |

(Continued)

(52) U.S. Cl.
CPC ............. *B32B 5/26* (2013.01); *B29C 70/14* (2013.01); *B29C 70/28* (2013.01); *B32B 27/08* (2013.01); *B32B 27/12* (2013.01); *B32B 27/38* (2013.01); *D01D 5/0007* (2013.01); *D01F 9/10* (2013.01); *B29K 2105/0809* (2013.01); *B29K 2105/0872* (2013.01); *B29K 2263/00* (2013.01); *B29K 2307/04* (2013.01); *B32B 2260/023* (2013.01);

(Continued)

(58) Field of Classification Search
CPC .... B29K 2105/0809; B29K 2105/0872; B29K 2263/00; B29K 2263/04; B29K 2307/04; D01D 5/0007; B32B 2260/023; B32B 2260/046; B32B 2262/106; B32B 27/08; B32B 27/12; B32B 27/38; B32B 5/26; B32B 2262/102; B29C 70/14
USPC ............. 264/465, 10; 428/220, 300.1, 298.1, 428/297.4, 903, 292.1; 442/346, 381, 392
See application file for complete search history.

(56) References Cited

U.S. PATENT DOCUMENTS

| | | | |
|---|---|---|---|
| 6,265,333 B1 * | 7/2001 | Dzenis ..................... | B32B 5/28 156/276 |
| 2012/0077032 A1 * | 3/2012 | Chasiotis ............ | D01D 5/0076 428/373 |

OTHER PUBLICATIONS

Molnar et al., The effect of needleless electrospun nanofibrous interleaves on mechanical properties of carbon fabrics/epoxy laminates. eXPRESS Polymer Letters, vol. 8, No. 1 (Jan. 2014).*

* cited by examiner

*Primary Examiner* — Camie S Thompson
(74) *Attorney, Agent, or Firm* — McDonnell Boehnen Hulbert & Berghoff LLP

(57) ABSTRACT

The present disclosure relates to the development of high performance light weight carbon fiber fabric-electrospun carbon nanofibers hybrid polymer composites and a process thereof. In this process continuous carbon nanofiber sheets of diameter in the range of few hundred nanometers are developed from electrospun PAN nanofibers and sandwich (Continued)

between the carbon fiber fabric epoxy resin prepregs to develop hybrid polymer composites by compression molding technique with low content of carbon fibers.

11 Claims, 3 Drawing Sheets

(51) Int. Cl.
*B32B 27/08* (2006.01)
*B29C 70/28* (2006.01)
*B29C 70/14* (2006.01)
*B29K 105/08* (2006.01)
*B29K 263/00* (2006.01)
*B29K 307/04* (2006.01)

(52) U.S. Cl.
CPC ... *B32B 2260/046* (2013.01); *B32B 2262/106* (2013.01)

HIGH PERFORMANCE LIGHT WEIGHT CARBON FIBER FABRIC-ELECTROSPUN CARBON NANOFIBERS HYBRID POLYMER COMPOSITES

CROSS-REFERENCE TO RELATED APPLICATIONS

This application claims the benefit of priority of Indian Patent Application no. 2417/DEL/2014, filed Aug. 26, 2014, which is hereby incorporated herein by reference in its entirety.

FIELD OF THE INVENTION

The present invention relates to carbon fiber-electrospun carbon nanofiber epoxy resin hybrid polymer composites which comprises semi aligned continuous carbon nanofibers sheet derived from polyacrylonitrile (PAN) based electrospun nanofibers sandwiched between carbon fiber laminates epoxy resin polymer composites made there from with only 30±2 wt % of carbon fibers. These high performance light weight polymer composites have applications in aerospace, military, automobile, turbine blades of wind mill, sporting goods, etc.

BACKGROUND OF THE INVENTION

Carbon fiber reinforced polymer composites have been extensively used in different applications owing to their high specific strength and stiffness, excellent corrosion resistance. The composites made of polymeric resin reinforced with continuous or discontinuous fibers, whiskers, particles and now nanomaterials. The composites material made from constituents that remain recognizable individually in the composite. In the late 1950s, fiber composite materials were known to many engineers and their advantages in the term of corrosion resistance, light weight and high strength were apparent. The fiber is the load bearing component and the matrix dissipates loads to the fibers, maintains fiber orientation and protect fibers from extreme environmental conditions. The composites are classified according to their matrix phase such as polymer matrix composite, metal matrix composites and ceramic matrix composites. Glass-reinforced polymer matrix (plastic) composite was commonly used because of specific mechanical properties (strength per unit weight) superior than steel and aluminum. Since after the carbon fiber known, which has high specific strength as compared to glass fibers, lots of work is in progress for its use in different applications. The strength and stiffness of carbon fibers are provided of course, in just one direction in space-along the axis of the fiber and well aligned in unidirectional orientation and should have high reinforcement volume fraction.

In general, the composites are fabricated through impregnation of fibers (with high strength and high modulus) into resin matrices. In practice prepregs consisting of unidirectional or woven fiber fabrics are usually prepared prior to fabrication of the composites [E. Bkyarova, E. T. Thostenson, A, Yu, H. Kim, J. Gao, J. Tang, et al, Multiscale carbon nanotubes-carbon fiber reinforced for advanced epoxy composites, Langmuir 2007, 23, 3970-4]. In unidirectional polymer matrix composites strength is dominated by fiber volume contents [Effect of fiber volume fraction on mechanical properties of carbon fiber composites, [S. R. Dhakate, R. B. Mathur and T. L. Dhami, Mechanical properties of unidirectional carbon-carbon composites as function of fiber volume contents, Carbon Science 3, 3, 1-6, 2002]. While the laminated composites made from prepreg, the fiber fabric dominate the in-plane mechanical properties that are typically high enough for applications, whereas resin matrix dominates out of plane properties that are significantly lower than the in plane properties [J. Zhu, A. Imam, R. Crane, Processing a glass fiber reinforced vinyl ester composite with nanotubes enhancement of interlaminar shear strength, Composite Sci Technol. 2007; 67:1509-17] due to the poor bulk matrix and fiber-matrix interfacial properties. In order for carbon fiber reinforced polymer composites to offer better design choice over typical metallic structure for high end applications such as aerospace and military structures, significant improvements in their out of plane (Z-direction) properties are necessary. It is well known that composite structures in the form of laminates are extremely susceptible to cracks initiation and propagation along the laminar interfaces in various failure modes. The delamination is one of the most prevalent life limiting crack growth modes in laminate composites as delamination may cause severe reductions in in-plane strength and stiffness, potentially leading to catastrophic failure of the whole structure [J. K. Kim, Y. W. Mai, Engineered interfaces in fiber reinforced composites, Oxford Elsevier, 1998; J. K. Kim, Y. W. Mai, high strength, high fracture toughness fiber composites with interface control-a-review. Composite Sci. Technology, 1991, 41, 333-78]. In this direction several techniques has been devised to improve the delamination resistance [K. Dransfield, C, Baillie, Y. W. Mai, Improving the delamination resistance of CFRP by stitching—a review, Composite Sci. Technol. 1994, 50, 305-17; J. K. Kim, Methods for improving impact damage resistance of CFRPs. Key Eng. Mater. 1998; 141(143) 149-68, A. P. Mourutz, Review of Z-pinned composite lamintes, Compos, A. 2007; 38: 2383-97; M. Hoja, S. Matsuda, M. Tanaka, S. Ochiai, A. Murakami, Mode I delamination fatigue properties of interlayer-toughened CF/epoxy laminates. Compo Sci. Technol, 2006; 66: 665-75] such as designing 3D fabric architecture, transverse stitching or pinning the fabrics, fiber hybridization, toughening the matrix resin, and placing interleaves made of tough resin materials in the interplay regions of the laminates. These methods improved the inter-laminar properties but at the cost of the in-plane mechanical properties [C. A, Steeves, N. A. Fleck, In-plane properties of composite laminates with through-thickness pin reinforcement. Int. I. Solids Structures 2006; 43: 3197]. Therefore, it is necessary to find the effective technique to improve the toughness-thickness properties without compromising other mechanical and fracture properties of the composites.

With recent development of nanomaterials/nanotechnology since after discovery of carbon nanotubes by Ijima, polymer composites reinforced with nanoscale fillers have attracted growing interests among scientific community. The polymer composites reinforced with nanotubes, nanofibers and nanoparticles in matrices are expected to possess superior mechanical properties. However, several technological issues such as inadequate dispersion, alignment, and low volume fraction of nano-reinforcement, poor interfacial bonding strength and load transfer etc., the improvement of mechanical properties achieved so far are considerably lower than what have been predicated, in particular when compared to advanced composite reinforced with high performance continuous carbon fibers [Alexandre M, Dubois P. Polymer-layered silicate nanocomposites: preparation, properties and uses of a new class of materials. Mater SciEng R 2000; 28:1-63. Thostenson E T, Ren Z F, Chou T W. Advances in the science and technology of carbon nanotubes and their composites: a review. Compos SciTechnol 2001; 61:1899-912. Njuguna J, Pielichowski K. Polymer nanocomposites for aerospaceapplications: properties. AdvFunct Mater 2003; 5:769-78. Thostenson E T, Li C Y, Chou T W. Nanocomposites in context. Compos SciTechnol 2005; 65:491-516. Coleman J N, Khan U, Gunoko Y K. Mechanical reinforcement of polymers using carbon nanotubes. Adv Mater 2006; 18:689-706. Tjoing S C. Structural and mechanical properties of polymer nanocomposites. Mater SciEng R 2006; 53:73-197. Chou T W, Gao L M, Thostenson E T, Zhang Z G, Byun J H. An assessment of the science and technology of carbon nanotube-based fibers and composites. ComposSciTechnol 2010; 70:1-19]. It is reported that nanoscale reinforcements could distinguishably enhance the toughness and damage tolerance of traditional structural composites used broadly in aerospace structures [Bkyarova E, Thostenson E T, Yu A, Kim H, Gao J, Tang J, et al. Multiscale carbon nanotubes-carbon fiber reinforcement for advanced epoxy composites. Langmuir 2007; 23:3970-4. Thostenson E T, Gangloff J J, Li C Y, Byun J H. Electrical anisotropy in multi-scale nanotubes/fiber composites. ApplPhysLett 2009; 97:073111. Dzenis Y A, Reneker D H. Delamination resistant composites prepared by small diameter fiber reinforcement at ply interfaces. U.S. Pat. No. 6,265,333; 2001. Dzenis Y. Structural nanocomposites. Science 2008; 319:419-20. Wu X F. Fracture of advanced polymer composites with nanostructured interfaces: fabrication, characterization and modeling. Germany: VDM Verlag Publishing House; 2009]. It is predicted theoretically and validated by some experiments that the hybrid multi-scale fiber-reinforced composites with uniformly distributed nano-reinforcement filler (between neighboring composite laminas/prepregs) would possess much enhanced mechanical properties [Dzenis Y A, Reneker D H. Delamination resistant composites prepared by small diameter fiber reinforcement at ply interfaces. U.S. Pat. No. 6,265,333; 2001. Dzenis Y. Structural nanocomposites. Science 2008; 319: 419-20. Wu X F. Fracture of advanced polymer composites with nanostructured interfaces: fabrication, characterization and modeling. Germany: VDM Verlag Publishing House; 2009]. So, one promising approach is based upon incorporation of nano-reinforcement agents/fillers between composite laminas/prepregs to form hybrid multi-scale composites. But still the mechanical properties of many hybrid multi-scale composites that have been developed so far are not as high as expected due to the technological challenge on uniform dispersion of nanoscale fillers in highly viscous resins. Hence, it is important to develop a process to fabricate laminated polymer composites with uniformly dispersed nano-reinforcements in the interlaminar regions. So that properties of carbon fiber is exploited in the larger extent in the carbon fiber reinforced polymer composite.

With the discovery of nanotubes by Japanese scientist Ijima, polymer composites reinforced with nanoscale fillers/agents have attracted growing interests among researchers. The polymer composites reinforced with nanotubes, nanofibers, and/or nanoparticles in matrices are expected to possess superior mechanical properties. However, due to several technological issues e.g., poor dispersion/alignment and low volume fraction of nano-reinforcements, poor interfacial bonding strength and load transfer, etc., mechanical properties achieved so far are considerably lower than what is predicted, in particular when compared to advanced composites reinforced with high-performance continuous fibers [M. Alexandre, P. Dubois, polymer-layered silicate nanocomposites: preparation, properties and uses of new class of materials. Mater SciEng R 2000, 28, 1-63; E. T. Thostenson, Z. F. Ren, T. W. Chou, Advances in the science and technology of carbon nanotubes and their composites: a review, Composites Science and technology 2001, 61, 1899-912; J. Njuguna, K. Pielichowski, Polymer nanocomposites for aerospace applications: properties. AdvFunct Mater 2003, 5, 769-78; E. T. Thostenson. C. Y. Li, T. W. Chou, Nanocomposites in content Composite Science and technology 2005, 65, 491-516; J. N. Coleman, U. Khan, Y. K. Gun'ko, Mechanical reinforcement of polymers using carbon nanotubes. Adv Mater 2006, 18, 689-706; S. C. Tjoing, Structural and mechanical properties of polymer nanocomposites, Mat SciEng R 2006, 53, 73-197; T. W. Chou, L. M. Gao, E. T. Thostenson, Z. G. Zhang, J. H. Byun, An assessment of the science and technology of carbon nanotubes based fiber and composites, Composite Science Technology 2010, 70, 1-19].

One of the problem of the carbon fiber laminate reinforced polymer composites is due to ply-by-ply nature of resin composites, susceptibility to delamination along interlaminar planes is an intrinsic and severe problem in the 2D polymer composite [A. C. Carg, "Delamination—A Damage Mode in Composite Structures," Engineering Fracture Mechanics, 1986, 29, 557-584]. The delamination substantially reduces load carrying capacity and durability of composites and has led disastrous structural failure. In this direction to various effort has been undertaken to improve delamination resistance. Resin chemistry has been modified by incorporating the nanomaterials to improve fracture toughness of resin. It is presume that due to extra ordinary high properties of nanomaterial it has been expected that nanocomposites not only control the delamination but also helped in improving properties of polymer based composites. However recent investigations have revealed that nanoscale reinforcements could distinguishably enhance the toughness and damage tolerance of traditional structural composites used broadly in aerospace structures [X. F. Wu, Fracture of advanced polymer composites with nanofiber reinforced interface, PhD Thesis, University of Nebraska-Lincoin, 2003; P, Karapapas, S. Tsantzalis, E. Flamegou, A. Vavouliotis, K. Dassios, V. Kostopoulos, Multiwalled carbon nanotubes chemically grafted and physically adopted on reinforcing carbon fibers. Adv Composites letter 2008, 17, 103-7]. One promising approach is based upon incorporation of continuous nano-reinforcement agents/fillers between composite laminas/prepregs to form hybrid multi-scale composites. In this direction some studies has been carried out so for.

Y. A. Dzenis et al, incorporated the nanofibers interface in fiber reinforced polymer composites. [Y. Dzenis, Structural nanocomposites. Science 2008; 319:419-20] In advanced aerospace based carbon fiber-epoxy composites less than 1 wt. % of polymer nanofibers improved static and fatigue peel and shear interlaminar fracture toughness [Y. A. Dzenis, Darrll H, Renkar, Delamination resistant composites propertied by small diameter fibers reinforced at ply interface, U.S. Pat. No. 6,265,333, 2001].

S. U. Khan et al, introduced carbon nanofiberbucky paperin between the unidirectional carbon fiber prepreg. The interlaminar shear strength and fracture toughness of multiscale composites containing bucky paper increases by 31% and 104% as compared to composite without bucky paper at interface [S. U. Khan, J. K. Kim, Improved interlaminar shear properties of multiscale carbon fiber composites with bucky paper interleave made from carbon nanofibers, carbon 50, 2012, 5265-5277).

Q. Chen et al, used electrospun carbon nanofibers sheet to sandwich between carbon fiber fabric to develop hybrid multiscale epoxy composites. One sheets carbon nanofiber put between the two carbon fiber fabric sheets to prepare the composites. It is reported that, interlaminar shear strength increases by 86% and bending strength 11% as compared to control composite with carbon nanofibers [Qi. Chen, L. Zhang, A. Rahman, Z. Zhou, X. F. Wu, H. Fong, Hybrid multi-scale epoxy composite made of conventional carbon fiber fabric with interlaminar regions containing electrospun carbon nanofibers mats. Composites Part A 42, 2011, 2036-2042). In another course of investigation, Q. Chen et al, PAN based nanofiber directly electrospun on to the conventional T-300 carbon fiber fabric for different time intervals (5, 10, 20 and 30 min). The stabilization and carbonization of PAN based nanofibers on carbon fiber fabric was carried out. The hybrid multiscale epoxy reinforced with electrospun carbon nanofiber-carbon fiber fabric was developed by vacuum resin transfer molding technique. It is reported that flexural strength of hybrid composites increases from 376 MPa to 465 MPa and interlaminar shear strength 27.5 MPa to 88 MPa while modulus from 12.1 to 24.8 GPa for the optimum collection time of PAN nanofiber on the Carbon fiber fabrics 10 min. [Qi Chen, Yong Zhao, Zhengping Zhou, Arifur Rahman, Xiang-Fa Wu, Weidong Wu, Tao Xu, Hao Fong, Fabrication and mechanical properties of hybrid multi-scale epoxy composites reinforced with conventional carbon, Composites: Part B 44 (2013) 1-7]. Recently, electrospun carbon nanofibers are used to modify the epoxy resin to use as matrix for the development of hybrid multi-scale composites by vacuum assisted resin transfer molding. It is reported that addition of 0.3% of carbon nanofibers in epoxy resin is able to increase the impact absorption energy by 79.1%, interlaminar shear strength by 42.2% and flexural strength by 13.6% [Qi Chen, Weidong Wu, Yong Zhao, Min Xi, Tao Xu, Hao Fong, Nano-epoxy resins containing electrospun carbon nanofibers and the resulting hybrid multi-scale composites, Composites par B, 58, 2014, 43-53]. While in the present invention different approach was adapted to improve the strength of carbon fiber fabric reinforced epoxy matrix composites.

OBJECTIVE OF THE INVENTION

In certain aspects and embodiments, the present disclosure provides carbon fiber-carbon nanofiber epoxy resin hybrid polymer composites which comprise semi aligned continuous carbon nanofibers sheet derived from polyacrylonitrile (PAN) based electrospun nanofibers sandwiched between carbon fiber laminates epoxy resin polymer composites.

In certain aspects and embodiments, the present disclosure provides carbon fiber laminate hybrid polymer composites having improved bending strength.

In certain aspects and embodiments, the present disclosure provides carbon fiber laminate hybrid polymer composites having improved interlaminar shear strength.

In certain aspects and embodiments, the present disclosure provides hybrid polymer composites having reduced carbon fiber content but retaining high strength.

In certain aspects and embodiments, the present disclosure provides a material which sandwiches a continuous carbon nanofiber sheet with carbon fiber laminates epoxy resin polymer composites.

In certain aspects and embodiments, the present disclosure provides materials which incorporate carbon nanofibers sheet in different weight fraction in between carbon fiber laminate to develop high performance light weight composites.

In certain aspects and embodiments, the present disclosure provides high performance light weight carbon fiber-carbon nanofiber Hybrid composites suitable for use in different applications such as aerospace industry, wind energy, sporting goods, automobiles, etc.

SUMMARY OF THE INVENTION

Accordingly, in one aspect the present invention relates to the carbon fiber-carbon nanofiber epoxy resin hybrid polymer composites which comprise semi aligned continuous carbon nanofibers sheet derived from polyacrylonitrile (PAN) based electrospun nanofibers sandwiched between carbon fiber laminates epoxy resin polymer hybrid composites wherein the thickness of composites is 2 to 3 mm and contains 28-32 wt % of carbon fiber fabric.

In one embodiment of the present invention the carbon fiber fabric-carbon nanofiber epoxy resin hybrid polymer composite has bending strength between 300 to 750 MPa.

In an embodiment of the present invention the carbon fiber fabric-carbon nanofiber epoxy resin hybrid polymer composite has interlaminar shear strength between 25 to 60 MPa.

In another embodiment of the present invention the carbon fiber fabric-carbon nanofiber epoxy resin hybrid polymer composite has modulus between 10 to 50 G Pa.

In another embodiment of the present invention a process for the preparation of carbon fiber fabric-carbon nanofiber epoxy resin hybrid polymer composite comprises;
(I) electrospinning 8-12 wt % Polyacrylonitrile (PAN) in an organic solvent at applied voltage 15-20 KV and drum collector speed 2000-3000 rpm for 10-20 hrs followed by stabilizing PAN electrospun nanofiber at 200-300° C. at heating rate 1 to 5° C./min and carbonization of stabilized PAN nanofiber sheets at 800-1000° C. to get continuous carbon nanofiber sheets having diameter in the range of 200-300 nm.
(II) impregnating carbon fiber fabric with thermosetting epoxy resin and composite is developed by using compression molding technique and thereafter curing at temperature 50-100° C. for a period ranging between 1-3 h to develop carbon fiber polymer composite.
(III) sandwiching carbon nanofiber sheet as obtained in step (i) between carbon fiber fabric impregnated by thermosetting epoxy resin as obtained in step (ii) to prepare carbon fiber-carbon nanofiber epoxy resin hybrid polymer composite.

In still another embodiment of the present invention organic solvent is selected from the group consisting of N,N dimethylformamide, N-Methyl-2-pyrrollidone, tetrahydrofuran.

In still another embodiment of the present invention the carbon nanofiber content in carbon fiber-carbon nanofiber epoxy resin hybrid polymer composite varies between 0.3 to 3.0 wt %.

DETAILED DESCRIPTION OF THE INVENTION

Figure 1:
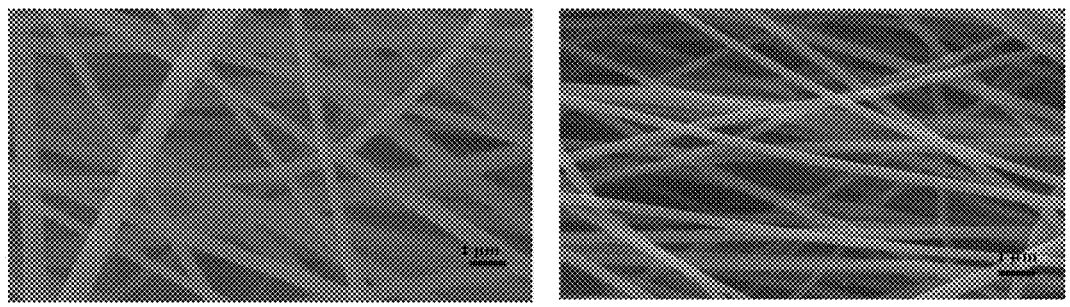
FIG. 1 is a SEM micrograph of electrospun continuous PAN copolymer nanofiber and carbon nanofiber sheet derived from PAN copolymer based electrospun nanofibers.
Figure 2:
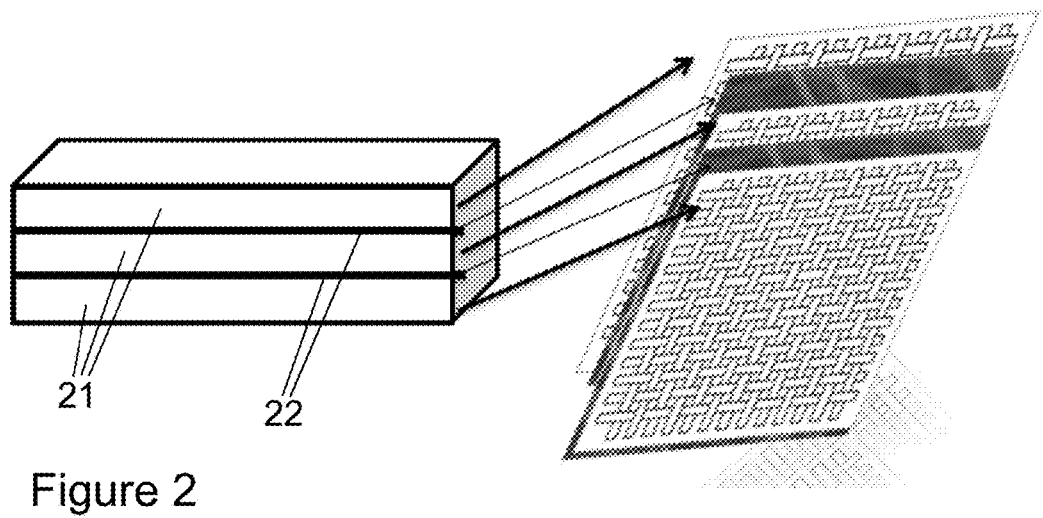
FIG. 2 is a schematic view of a carbon fiber-carbon nanofiber hybrid composite, in which a carbon fiber fabric is indicated by reference numeral 21 and a carbon nanofiber sheet is indicated by reference numeral 22.
Figure 3:
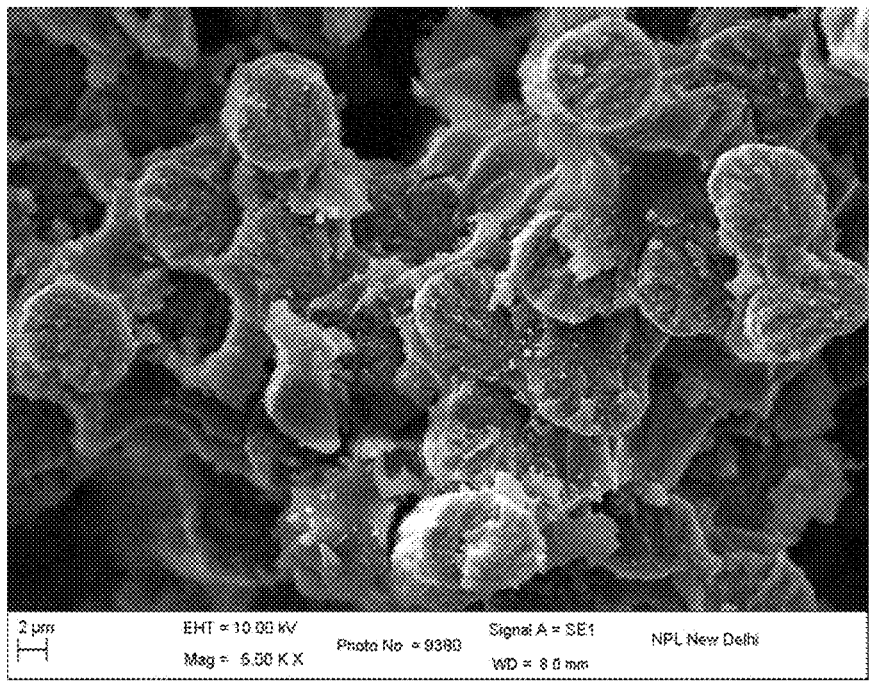
FIG. 3 is a micrograph showing carbon fiber distribution and bonding with epoxy resin.
Figure 4:
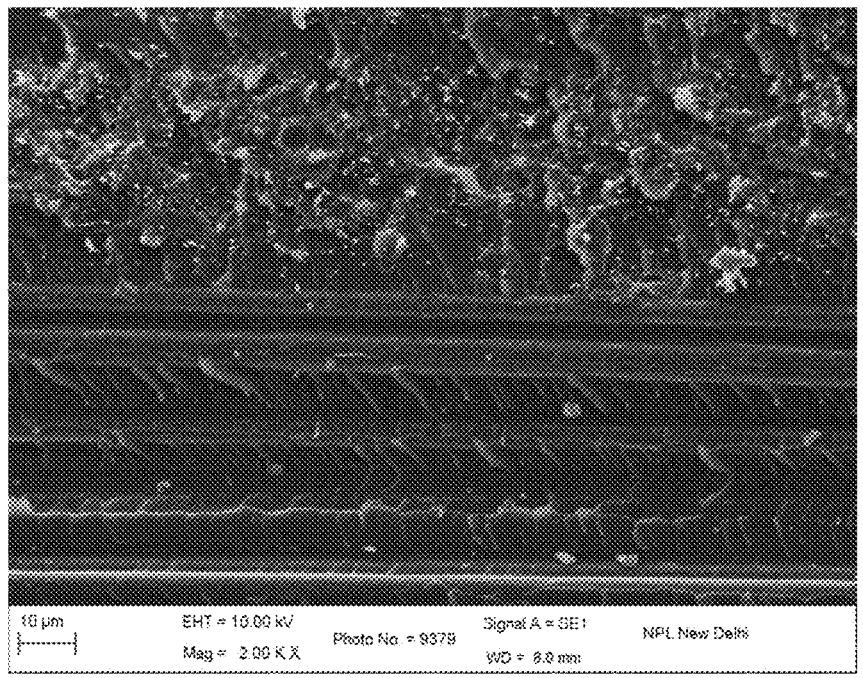
FIG. 4 is a micrograph of a carbon nanofiber sheet on the carbon fiber fabric surface sandwich.
Figure 5:
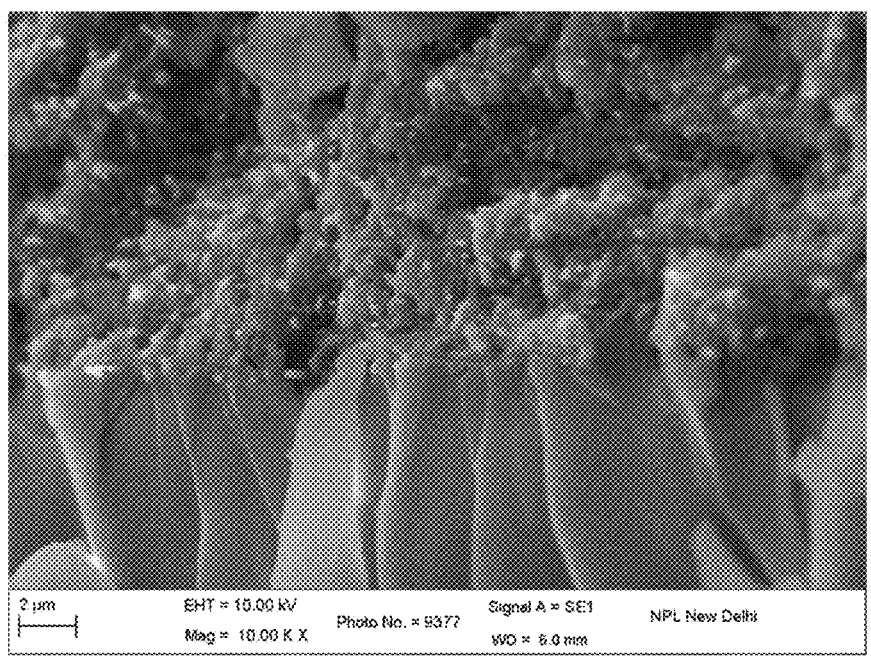
FIG. 5 is a micrograph of the microstructure of a carbon fiber-carbon nanofiber reinforced hybrid polymer composite.

In certain aspects, the disclosure relates to the development of high performance light weight carbon fiber fabric-electrospun carbon nanofibers epoxy hybrid polymer composites without increasing bulk density of composite. Generally, carbon fiber polymer composite are being developed with carbon fiber content 30 to 60 wt % and mechanical properties of unidirectional fiber composite are fiber content dependent. Apart from fiber content, mechanical properties of composite depends upon bulk density, properties of fiber and matrix and fiber-matrix interface. While in case of 2D carbon fiber composites, due to axial and transverse mismatch of coefficient of thermal expansion between fiber and matrix, their interactions becomes weak and causes delamination. This delamination substantially reduces load carrying capacity and durability of composites and leads to disastrous structural failure and hence poor mechanical properties of the composite. To improve mechanical properties of 2D composites, in the present invention, nano interfacing approach was adapted.

The electrospun continuous carbon nanofiber sheets were fabricated from electrospun PAN nanofibers converted to carbon nanofiber by subsequent stabilization and carbonization processes.

The 2D carbon fiber fabric thermosetting epoxy polymer composites were developed from 30±2 wt % of carbon fiber content. The epoxy resin (epoxy resin and hardener triethylenetetramine in the ratio of 100:12.5) content was 70±2 wt %.

The carbon fiber fabric epoxy resin polymer composites developed by compression molding technique with 30±2 wt % of carbon fibers gave bending strength of 398 MPa, interlaminar shear strength of 32 MPa and Modulus of 20.6 GPa.

The carbon fiber fabric epoxy polymer hybrid composites developed by sandwiching carbon nanofiber sheet on carbon fiber laminate prepreg by compression molding technique.

The carbon nanofibers of 2 to 8 sheets and size 60 mm×12 mm were sandwiched between the carbon fiber fabric preform.

It was found that carbon nanofibers sheets in the range of 0.5 to 3.0 weight % sandwich between the carbon fiber fabric laminates in the hybrid polymer composite gives maximum bending strength of 730 MPa, interlaminar shear strength of 56.8 MPa and modulus of 43 GPa.

The hybrid polymer composite with 1.1 wt % of carbon nanofibers gives the maximum properties. It increases bending strength by 175%, interlaminar shear strength by 190% and modules by 200% as compared to control composite with 30±2 wt % of high strength carbon fiber fabric without carbon nanofibers.

The present invention relates in certain aspects to the development of high performance light weight carbon fiber-carbon nanofiber hybrid polymer composite. The processing steps include:

a) development of continuous carbon nanofiber sheet from PAN based electrospun nanofibers.

b) development of carbon fiber-electrospun carbon nanofibers hybrid polymer composites by compression molding technique with different weight fraction carbon nanofiber sheets.

c) Characterization of carbon fiber-electrospun carbon nanofiber hybrid polymer composites for bending strength and interlaminar shear strength.

In this investigation the carbon fiber-carbon nanofiber reinforced polymer composites developed by compression molding technique with improved bending strength, modulus and interlaminar shear strength with only carbon fiber content 30±2 wt % in which carbon nanofiber sheets sandwich between carbon fiber fabric laminates prepreg in different weight fraction ranging from 0.5 to 3.0%. The continuous carbon nanofiber sheets between carbon fiber prepreg reduced the porosity and increased bulk density. The carbon nanofiber sheets improve the mechanical properties of matrix and load transferring ability which is lacking in the 2D carbon fabric composite. The bending strength of carbon nanofiber reinforced composite increases from 400 MPa to 730 MPa, modulus from 21 GPa to 43 GPa and interlaminar shear strength from 32 MPa to 56 MPa. The bending strength value of ~730 MPa to be achieved required the carbon fiber fabric content more than 60% in polymer based carbon fiber composite.

EXAMPLES

The following examples are given by way of illustration of the working of the invention in actual practice and therefore should not be construed to limit the scope of the present invention.

Example 1

The polymer having high carbon yield has been taken as source polymer for the synthesis of continuous electrospun polymer nanofiber sheet. The polyacrylonitrile 12 wt % solution was prepared by dissolving in organic solvent (N, N Dimethylformamide) to get spinable solution of weight content 12 wt %. The solution was stirred on magnetic stirrer for 18 h to get uniformly mixture. The prepared solution was electrospun at 0.50 ml/hr at applied voltage 15 KV. Tip to collector distance was kept 20 cm and collector speed 2000 rpm. The collected fibers were continuous on collector.

Example 2

As per Example 1, solution prepared from 12 wt % of polyacrylonitrile (PAN) in N,N Dimethylformamide was electrospun at flow rate of 0.20 ml/hr, tip to collector distance 20 cm and drum collector speed 2000 rpm. Voltage was kept at 15 KV. The continuous polymer nanofibers collected on the collector of diameter from 500-600 nm.

Example 3

As per example 2, PAN based nanofiber sheets are stabilized at 300° C. in oxidizing atmosphere (in Air) at heating rate 2° C./min to get thermally stable nanofiber sheets. The stabilized nanofiber sheet carbonized at 1000° C. and to get carbon nanofibers having diameter less than stabilized nanofibers (200-300 nm).

Example 4

The carbon fiber fabric polymer composites developed with fiber volume fraction 30 wt % and polymeric epoxy resin content 70 wt %. The 2D carbon fiber fabric polymer composite was developed by compression molding technique. The carbon fiber fabric impregnated by thermosetting epoxy resin in which the ratios epoxy resin and hardener was 100:12.5. On the impregnated fabric sheets left for 1 hr at 40° C. to release excess resin and solvent. The impregnated structure was placed in die mold and kept in the hot plate of hydraulic press. At desired temperature of 60° C., pressure 100 Kg/cm$^2$ was applied and die mold was kept at the temperature 100° C. for 1 hr for complete curing.

Finally the carbon fiber polymer composites possessing 30±2 wt % of fiber content obtained. The composite have bending strength 398 MPa, interlaminar shear strength 32 MPa and Modulus 20.6 GPa.

Example 5

Carbon fiber polymer composites are developed using 50 wt % of carbon fiber content and epoxy resin content 50%. Same process as per example 4, used for making the composites. The composite have bending strength 540 MPa, interlaminar shear strength 36 MPa and Modulus 40.6 GPa Example 6

As per Example 4, carbon fiber fabric sheets were impregnated and then sandwiched with continuous carbon nanofiber sheets and left for 1 hr at 40° C. to release excess resin and solvent. The impregnated sandwich structure placed in die mold and kept in the hot plate of hydraulic press. At desired temperature 60° C. and 100 Kg/cm$^2$ pressure was applied and Lateran die mold kept at the 100° C. for 1 hr for complete curing. Finally, carbon fiber fabric-carbon nanofiber polymer hybrid composites of thickness 2 mm with different weight (0.5 to 3.0%) content of carbon nanofibers were prepared.

Example 7

Carbon fiber fabric epoxy polymer hybrid composites developed by sandwiching carbon nanofiber sheets on carbon fiber laminate prepreg followed by compression molding technique as process mentioned in example 6. It was found that carbon nanofibers sheets 0.6 wt % of the carbon fiber fabric weight at interfaces or sandwich between carbon fiber fabric laminates in the hybrid polymer composites gives maximum bending strength 449 MPa, interlaminar shear strength 51 MPa and modulus 20 GPa.

Example 8

Carbon fibers fabric epoxy polymer hybrid composites developed by sandwiching carbon nanofiber sheet on carbon fiber laminate prepreg and by compression molding technique as process mentioned in example 6. It was found that carbon nanofibers sheets of weight 0.9% of the carbon fiber fabric weight at interface or sandwich between carbon fiber laminates in the hybrid polymer composites gives maximum bending strength 528 MPa, interlaminar shear strength 54 MPa and modulus 31 GPa.

Example 9

Carbon fibers fabric epoxy polymer hybrid composites developed by sandwiching carbon nanofiber sheet on carbon fiber laminate prepreg by compression molding technique as process mentioned in example 6. It found that carbon nanofibers sheets of weight 1.1% of the carbon fiber fabric weight at interface or sandwich between carbon fiber laminates in the hybrid polymer composites gives maximum bending strength 730 MPa, Interlaminar shear strength 56.8 MPa and modulus 43 GPa in which carbon nanofiber content was 1.1 wt %.

Example 10

Carbon fibers fabric epoxy polymer hybrid composites developed by sandwiching carbon nanofiber sheet on carbon fiber laminate prepreg and by compression molding technique as process mentioned in example 6. It found that carbon nanofibers sheets of weight 1.3% of the carbon fiber fabric weight at interface or sandwich between carbon fiber laminates in the hybrid polymer composites gives maximum bending strength 672 MPa, Interlaminar shear strength 49 MPa and modulus 34 GPa.

Example 11

Carbon fibers fabric epoxy polymer hybrid composites developed by sandwiching carbon nanofiber sheet on carbon fiber laminate prepreg and by compression molding technique as process mentioned in example 6. It was found that carbon nanofibers sheets of weight 1.7% of the carbon fiber fabric weight at interface or sandwich between carbon fiber laminates in the hybrid polymer composites gives maximum bending strength 602 MPa, Interlaminar shear strength 46 MPa and modulus 33 GPa.

Example 12

Carbon fibers fabric epoxy polymer hybrid composites developed by sandwiching carbon nanofiber sheet on carbon fiber laminate prepreg and by compression molding technique as process mentioned in example 6. It was found that carbon nanofibers sheets of weight 1.9% of the carbon fiber fabric weight at interface or sandwich between carbon fiber fabric laminates in the hybrid polymer composites gives maximum bending strength 594 MPa, interlaminar shear strength 20 MPa and modulus 31 GPa.

Example 13

Carbon fibers fabric epoxy polymer hybrid composites developed by sandwiching carbon nanofiber sheet on carbon fiber laminate prepreg and by compression molding technique as process mentioned in example 6. It was found that carbon nanofibers sheets of 3.0 wt % of the carbon fiber fabric weight, at interface or sandwich between carbon fiber laminates in the hybrid polymer composites gives maximum bending strength 481 MPa and interlaminar shear strength 27 MPa.

Advantage of the Invention

In certain aspects, various embodiments of the disclosure provide one or more of the following advantages.
1. The light weight hybrid polymer composites developed by incorporating continuous carbon nanofiber sheets between carbon fiber fabric prepreg with only 30±2 wt % carbon fiber content.
2. Cost effective technique for the development of high performance carbon fiber composite.
3. The light weight composites with enhanced mechanical properties and with reduced defects.

4. Light weight composite has many applications in the areas like aerospace, military, satellite, automobile, sport goods and wind energy as turbine blades etc.

We claim:

1. A carbon fiber fabric-carbon nanofiber epoxy resin hybrid polymer composite comprising unidirectionally aligned continuous carbon nanofiber sheet derived from polyacrylonitrile (PAN) based electrospun nanofibers, sandwiched between carbon fiber fabric laminates, wherein the thickness of composite is 2 to 3 mm and contains 30±2 wt % of carbon fibers.

2. The carbon fiber fabric-carbon nanofiber epoxy resin hybrid polymer composite of claim 1 having a bending strength between 300 to 750 MPa.

3. The carbon fiber fabric-carbon nanofiber epoxy resin hybrid polymer composite of claim 1 having an interlaminar shear strength between 25 to 60 MPa.

4. The carbon fiber fabric-carbon nanofiber epoxy resin hybrid polymer composite of claim 1 having a modulus between 10 to 50 GPa.

5. A process for preparing a carbon fiber fabric-carbon nanofiber epoxy resin hybrid polymer composite as claimed in claim 1, wherein the said process comprises:
   i. electrospinning 8-12 wt % Polyacrylonitrile (PAN) in an organic solvent at applied voltage 15-20 KV and drum collector speed 2000-3000 rpm for 10-20 hrs followed by stabilizing PAN electrospun nanofiber at 200-300° C. at heating rate 1 to 5° C./min and carbonization of stabilized PAN nanofibers sheets at 800-1000° C. to get continuous carbon nanofiber sheets having diameter in range of 200-300 nm;
   ii. impregnating carbon fiber fabric with thermosetting epoxy resin and composite is developed by using compression molding technique and thereafter curing at temperature 50-100° C. for a period ranging between 1-3 h to develop carbon fiber polymer composite; and
   iii. sandwiching carbon nanofiber sheet as obtained in step (i) between carbon fiber fabric impregnated by thermosetting epoxy resin as obtained in step (ii) to prepare the carbon fiber fabric-carbon nanofiber epoxy resin hybrid polymer composite.

6. The process as claimed in claim 5, wherein the organic solvent is selected from the group consisting of N,N-dimethylformamide, N-Methyl-2-pyrrollidone and tetrahydrofuran.

7. The process as claimed in claim 5, wherein the carbon nanofiber content in the carbon fiber-carbon nanofiber epoxy resin hybrid polymer composite varies between 0.5 to 3.0 wt %.

8. A carbon fiber fabric-carbon nanofiber epoxy resin hybrid polymer composite comprising unidirectionally aligned continuous carbon nanofiber sheet derived from polyacrylonitrile (PAN) based electrospun nanofibers, sandwiched between carbon fiber fabric laminates, wherein the thickness of composite is 2 to 3 mm and contains 30±2 wt % of carbon fibers, wherein the carbon fiber fabric-carbon nanofiber epoxy resin hybrid polymer composite is prepared by a process comprising:
   i. electrospinning 8-12 wt % Polyacrylonitrile (PAN) in an organic solvent at applied voltage 15-20 KV and drum collector speed 2000-3000 rpm for 10-20 hrs followed by stabilizing PAN electrospun nanofiber at 200-300° C. at heating rate 1 to 5° C./min and carbonization of stabilized PAN nanofibers sheets at 800-1000° C. to get continuous carbon nanofiber sheets having diameter in range of 200-300 nm;
   ii. impregnating carbon fiber fabric with thermosetting epoxy resin and composite is developed by using compression molding technique and thereafter curing at temperature 50-100° C. for a period ranging between 1-3 h to develop carbon fiber polymer composite; and
   iii. sandwiching carbon nanofiber sheet as obtained in step (i) between carbon fiber fabric impregnated by thermosetting epoxy resin as obtained in step (ii) to prepare the carbon fiber fabric-carbon nanofiber epoxy resin hybrid polymer composite.

9. The carbon fiber fabric-carbon nanofiber epoxy resin hybrid polymer composite of claim 8 having a bending strength between 300 to 750 MPa.

10. The carbon fiber fabric-carbon nanofiber epoxy resin hybrid polymer composite of claim 8 having an interlaminar shear strength between 25 to 60 MPa.

11. The carbon fiber fabric-carbon nanofiber epoxy resin hybrid polymer composite of claim 8 having a modulus between 10 to 50 GPa.

* * * * *